(12) United States Patent
Matsubara et al.

(10) Patent No.: US 7,692,531 B2
(45) Date of Patent: Apr. 6, 2010

(54) REMOTE STARTING CONTROL SYSTEM

(75) Inventors: Manabu Matsubara, Kobe (JP);
Minoru Yoshimura, Kobe (JP)

(73) Assignee: Fujitsu Ten Limited, Hyogo (JP)

( * ) Notice: Subject to any disclaimer, the term of this patent is extended or adjusted under 35 U.S.C. 154(b) by 1176 days.

(21) Appl. No.: 10/771,349

(22) Filed: Feb. 5, 2004

(65) Prior Publication Data

US 2007/0200667 A1      Aug. 30, 2007

(51) Int. Cl.
*G05B 23/00*      (2006.01)
(52) U.S. Cl. .................. 340/5.72; 307/10.5; 340/5.1
(58) Field of Classification Search ............. 340/5.72, 340/825.69, 5.64, 5.61, 5.25; 307/10.2, 10.3, 307/10.5
See application file for complete search history.

(56) References Cited

U.S. PATENT DOCUMENTS

| 5,995,013 | A | * | 11/1999 | Yoshizawa et al. | ......... | 340/5.23 |
| 2003/0222500 | A1 | * | 12/2003 | Bayeur et al. | ............. | 307/10.2 |

FOREIGN PATENT DOCUMENTS

| JP | 10-148170 | 6/1998 |
| JP | 10-176642 | 6/1998 |
| JP | 2001-270424 | 10/2001 |
| JP | 2002-257018 | 9/2002 |
| JP | 2002-266732 | 9/2002 |
| JP | 2002-322972 | 11/2002 |

* cited by examiner

*Primary Examiner*—Brian A Zimmerman
*Assistant Examiner*—Nabil H Syed
(74) *Attorney, Agent, or Firm*—Wenderoth, Lind & Ponack, L.L.P.

(57) ABSTRACT

The present invention teaches a remote starting control system having a simple construction and being low in cost, that can be mounted on a vehicle having an immobilizing function. The system, which is mounted on a vehicle equipped with an immobilizer for capturing a code output in response to an insertion of an ignition key into a key cylinder and permitting an engine start when judging the captured code to be a unique code of the vehicle so as to control engine starting according to an instruction from a portable transmitter, comprises a device for storing a code in an EEPROM each time the code is supplied to a signal line, and a device for supplying the code stored in the EEPROM to the immobilizer when receiving a start instruction of the engine from the portable transmitter.

11 Claims, 9 Drawing Sheets

REMOTE STARTING CONTROL SYSTEM

BACKGROUND OF THE INVENTION

1. Field of the Invention

The present invention relates to a remote starting control system and, more particularly, relates to a remote starting control system to be mounted on a vehicle having an immobilizing function.

2. Description of the Relevant Art

Recently, the number of vehicles having an antitheft function called an immobilizer has been increasing. The implementation of the immobilizing function (for engines), as shown in FIG. 8, requires an ignition key 1 having a chip 3 which stores a specific code and has a transmitting feature built into its grip portion 2, a key cylinder 4, a transponder 5 installed on the key cylinder 4, an immobilizer 6 which stores a unique code of a vehicle and shows its antitheft function, and an engine controller 7 to control engine starting and the like.

When the ignition key 1 is inserted into the key cylinder 4 by a vehicle driver (or the ignition key 1 is turned to the ACC output position or the IG output position of an ignition switch), a key insertion detection signal becomes high. When receiving the signal, the immobilizer 6 sends a startup signal through a signal line L1 to the transponder 5.

When receiving the startup signal, the transponder 5 conducts radio communication with the chip 3 of the ignition key 1 inserted in the key cylinder 4 to acquire the specific code stored in the chip 3, and outputs the acquired specific code with a clock signal through a signal line L2 to the immobilizer 6.

The immobilizer 6 judges whether or not the specific code sent from the transponder 5 matches up with the unique code of the vehicle previously stored. When these codes are judged to be the same, the driver who inserted the ignition key 1 into the key cylinder 4 is considered as an authorized driver, so that a permission signal for permitting an engine start is given to the engine controller 7.

The engine controller 7 conducts engine control such as fuel and ignition timing, when receiving a starter signal output from the key cylinder 4 after receiving the permission signal. On the contrary, the engine controller 7 does not conduct the engine control when receiving the starter signal without receiving the permission signal.

As described above, unless the code stored in the chip 3 of the ignition key 1 is the unique code of the vehicle, it is impossible to start the engine. Therefore, the engine cannot be started with an improper ignition key or direct coupling of the ignition switch, so that vehicle theft can be prevented.

Meanwhile, remote starting control systems for starting a machine such as an engine by remote control have been in the actual use. As shown in FIG. 9, a remote starting control system 18, after receiving a signal instructing an engine start from a portable transmitter 19 a driver carries with him/her, provides false signals corresponding to an ACC signal, an IG signal and a starter signal output when a proper ignition key 11 is turned to the starter output position to a signal line L3 of an ignition switch so as to send these false signals to an engine controller 17.

Thus, without inserting the ignition key 11 into a key cylinder 14 and turning it, the engine can be started only by sending the signal instructing an engine start from the portable transmitter 19.

However, in cases where the remote starting control system 18 is additionally mounted on a vehicle having the above-described immobilizing function, the engine cannot be started even if the false signals (false signals of an ACC signal, an IG signal and a starter signal) are sent to the engine controller 7, since matching of the unique code of the vehicle stored in the immobilizer 6, or an insertion of the proper ignition key 1 into the key cylinder 4 is required.

In order to solve such problem, two inventions have been known: Japanese Patent Kokai 1998-176642 (Publicly-known Example 1), wherein a remote starting control system, previously storing a unique code of a vehicle, sends the unique code of the vehicle to an immobilizer after receiving an instruction of an engine start by remote control, and the immobilizer gives the permission signal to an engine controller; and Japanese Patent Kokai 2001-270424 (Publicly-known Example 2), wherein a small transmitter removed from a proper ignition key (which stores a unique code of a vehicle, corresponding to the above chip 3) and a transponder installed on a key cylinder are electrically connected through an antenna, and when an instruction of an engine start from a portable transmitter is received, the transponder is activated to send the unique code of the vehicle transmitted from the small transmitter through the antenna to an immobilizer.

However, in the invention described in the Publicly-known Example 1, mode conversion (selection of a preset mode) is conducted in storing the unique code of the vehicle in the remote starting control system, and an operating part for the mode conversion is additionally required, resulting in a higher cost. On the other hand, in the invention described in the Publicly-known Example 2, another proper ignition key must be prepared, resulting in an increase in cost, similarly to the above Publicly-known Example 1.

SUMMARY OF THE INVENTION

The present invention was developed in order to solve the above problem, and it is an object of the present invention to provide a remote starting control system having a simple construction and being low in price, which can be mounted on a vehicle having an immobilizing function.

In order to achieve the above object, a first aspect of a remote starting control system according to the present invention is characterized by a remote starting control system, which is mounted on a vehicle equipped with a starting control device for capturing a prescribed code output in response to a predetermined operation, judging whether or not the captured prescribed code is a unique code of the vehicle and permitting a start of a machine such as an engine when judging these codes to be the same, so as to conduct starting control of the machine by remote control. The system includes a code storage part for storing a code, a first code storage controller which stores the prescribed code output in response to the predetermined operation in the code storage part each time receiving the prescribed code, and a code supply controller which supplies the prescribed code stored in the code storage part to the starting control device when receiving a start instruction signal of the machine by remote control.

The prescribed code output in response to the predetermined operation (for example, the prescribed code is stored and an ignition key including a chip having a transmitting function built into its grip portion is inserted into a key cylinder) matches up with the unique code of the vehicle, for example, when the ignition key is proper.

In the first aspect of the remote starting control system, the prescribed code output in response to the predetermined operation is stored in the code storage part. As a result, the prescribed code output in response to an insertion of the proper ignition key into the key cylinder or the like (or the unique code of the vehicle) is stored in the code storage part.

When a start instruction signal of the machine (such as an engine) by remote control is received, the prescribed code stored in the code storage part (or the unique code of the vehicle) is supplied to the starting control device. Here, as the machine, power generating devices such as an engine of an internal combustion engine automobile and a motor of an electric vehicle are exemplified.

As a result, even with the start instruction of the machine by remote control, the unique code of the vehicle can be supplied to the starting control device, similarly to a case where the proper ignition key is inserted into the key cylinder, so that a permission of a start of the machine can be given from the starting control device. Thus, even if the proper ignition key is not inserted into the key cylinder to be turned, the engine or the like can be started by remote control.

In the first aspect of the remote starting control system, each time the prescribed code output in response to the predetermined operation is received, the prescribed code is automatically stored in the code storage part. Therefore, mode conversion is not required, differently from the invention disclosed in the Publicly-known Example 1, so that the prescribed code can be stored in the code storage part without giving the user trouble. Accordingly, an operating part for conducting the mode conversion should not be required, resulting in a reduction in cost.

A second aspect of a remote starting control system according to the present invention is characterized by a remote starting control system, which is mounted on a vehicle equipped with a starting control device for capturing a prescribed code output in response to a predetermined operation, judging whether or not the captured prescribed code is a unique code of the vehicle and permitting a start of a machine such as an engine when judging these codes to be the same so as to conduct starting control of the machine by remote control. The system includes a code storage part for storing a code, a second code storage controller which stores the prescribed code output in response to the first predetermined operation after a supply of power in the code storage part, and a code supply controller which supplies the prescribed code stored in the code storage part to the starting control device when receiving a start instruction signal of the machine by remote control.

As described above, the prescribed code output in response to the predetermined operation (for example, the prescribed code is stored and an ignition key including a chip having a transmitting function built into its grip portion is inserted into a key cylinder) matches up with the unique code of the vehicle, for example, when the ignition key is proper.

In the second aspect of the remote starting control system, the prescribed code output in response to the first predetermined operation after a supply of power (for example, after the system is mounted on a vehicle and connected to a battery) is stored in the code storage part. As a result, the prescribed code output in response to an insertion of the proper ignition key into the key cylinder or the like (or the unique code of the vehicle) is stored in the code storage part.

When a start instruction signal of the machine (such as an engine) by remote control is received, the prescribed code stored in the code storage part (or the unique code of the vehicle) is supplied to the starting control device. Here, as the machine, power generating devices such as an engine of an internal combustion engine automobile and a motor of an electric vehicle are exemplified.

As a result, even with the start instruction of the machine by remote control, the unique code of the vehicle can be supplied to the starting control device, similarly to a case where the proper ignition key is inserted into the key cylinder, so that a permission of a start of the machine can be given from the starting control device. Thus, even if the proper ignition key is not inserted into the key cylinder to be turned, the engine or the like can be started by remote control.

In the second aspect of the remote starting control system, the prescribed code output in response to the first predetermined operation after a supply of power (for example, after the system is mounted on a vehicle and connected to a battery) is stored in the code storage part. In other words, the prescribed codes output in response to the second and later predetermined operations after the supply of power are not stored in the code storage part. Therefore, it is possible to prevent an improper code or a wrong code from being written into the code storage part.

In the second aspect of the remote starting control system, mode conversion is not required, differently from the invention disclosed in the Publicly-known Example 1, so that the prescribed code can be stored in the code storage part without giving the user trouble. Accordingly, an operating part for conducting the mode conversion is not required, resulting in a reduction in cost.

A third aspect of a remote starting control system according to the pre invention is characterized by comprising a suitability judgment part for judging whether or not the prescribed code output in response to the predetermined operation is suitable for storage in the code storage part, wherein the first or second code storage control stores the prescribed code in the code storage part when the prescribed code is judged be suitable for storage in the code storage part by the suitability judgment part in the first or second aspect of the remote starting control system.

By the way, in the first or second aspect of the remote starting control system, the prescribed code output in response to the predetermined operation (for example, the prescribed code is stored and an ignition key including a chip having a transmitting function built into its grip portion is inserted into a key cylinder) is stored in the code storage part. But, for example, in cases where the ignition key inserted into the key cylinder is not proper, a wrong code (or a code not being the unique code of the vehicle) is stored in the code storage part, so that the machine such as an engine cannot be started by remote control.

However, in the third aspect of the remote starting control system, only when the prescribed code output in response to the predetermined operation is judged to be suitable for storage in the code storage part, the prescribed code is stored in the code storage part. Therefore, it is possible to prevent storing of a wrong code.

A fourth aspect of a remote starting control system according to the present invention is characterized by the suitability judgment part which makes the judgment based on the state of the machine in the third aspect of the remote starting control system.

In the fourth aspect of the remote starting control system, the judgment on whether or not the code output in response to the predetermined operation (for example, the prescribed code is stored and an ignition key including a chip having a transmitting function built into its grip portion is inserted into a key cylinder) is suitable for storage in the code storage part is made based on the state of the machine (such as an engine).

For example, in cases where the proper ignition key is inserted into the key cylinder and turned to the starter output position, the engine is started. In other words, the code output in response to the operation, whereby the engine could be started can be considered as the unique code of the vehicle (or a code suitable for storage in the code storage part). Therefore, by making the judgment based on the state of the machine, the accuracy of the judgment can be enhanced.

A fifth aspect of a remote starting control system according to the present invention is characterized by a remote starting control system, which is mounted on a vehicle equipped with a starting control device for capturing a prescribed code output in response to a predetermined operation, judging whether or not the captured prescribed code is a unique code of the vehicle and permitting a start of a machine such as an engine when judging these codes to be the same so as to conduct starting control of the machine by remote control. The system includes a code storage part for storing a code, a suitability judgment part for judging whether or not the prescribed code output in response to the predetermined operation is suitable for storage in the code storage part, a third code storage controller which stores the prescribed code in the code storage part when the prescribed code is judged to be suitable for storage in the code storage part by the suitability judgment part, and a code supply controller which supplies the prescribed code stored in the code storage part to the starting control device when receiving a start instruction signal of the machine by remote control.

In the fifth aspect of the remote starting control system, the prescribed code output in response to the predetermined operation is stored in the code storage part. As a result, the prescribed code output in response to an insertion of a proper ignition key into a key cylinder or the like (or the unique code of the vehicle) is stored in the code storage part.

When a start instruction signal of the machine (such as an engine) by remote control is received, the prescribed code stored in the code storage part (or the unique code of the vehicle) is supplied to the starting control device. Here, as the machine, power generating devices such as an engine of an internal combustion engine automobile and a motor of an electric vehicle are exemplified.

As a result, even with the start instruction of the machine by remote control, the unique code of the vehicle can be supplied to the starting control device, similarly to a case where the proper ignition key is inserted into the key cylinder, so that a permission of a start of the machine can be given from the starting control device. Thus, even if the proper ignition key is not inserted into the key cylinder to be turned, the engine or the like can be started by remote control.

In the fifth aspect of the remote starting control system, only in cases where the prescribed code output in response to the predetermined operation is judged to be suitable for storage in the code storage part, the prescribed code is stored in the code storage part, so that it is possible to prevent a wrong code from being stored.

In the fifth aspect of the remote starting control system, mode conversion is not required, differently from the invention disclosed in the Publicly-known Example 1, so that the prescribed code can be stored in the code storage part without giving the user trouble. Accordingly, an operating part for conducting the mode conversion is not required, resulting in a reduction in cost.

A sixth aspect of a remote starting control system according to the present invention is characterized by the suitability judgment part which makes the judgment based on the state of the machine in the fifth aspect of the remote starting control system.

In the sixth aspect of the remote starting control system, the judgment on whether or not the prescribed code output in response to the predetermined operation (for example, the prescribed code is stored and an ignition key including a chip having a transmitting function built into its grip portion is inserted into a key cylinder) is suitable for storage in the code storage part is made based on the state of the machine (such as an engine).

For example, in cases where the proper ignition key is inserted into the key cylinder and turned to the starter output position, the engine is started. In other words, the code output in response to the operation, whereby the engine could be started can be considered as the unique code of the vehicle (or a code suitable for storage in the code storage part). Therefore, by making the judgment based on the state of the machine, the accuracy of the judgment can be enhanced.

A seventh aspect of a remote starting control system according to the present invention is characterized by the third code storage controller which stores the prescribed code first judged to be suitable for storage in the code storage part after a supply of power in the code storage part in the fifth or sixth aspect of the remote starting control system.

In the seventh aspect of the remote starting control system, only the code first judged to be suitable for storage in the code storage part after the supply of power (for example, after the system is mounted on a vehicle and connected to a battery) is stored in the code storage part, so that it is possible to prevent writing of an improper code or a wrong code into the code storage part.

An eighth aspect of a remote starting control system according to the present invention is characterized by comprising a matching judgment part for judging whether or not the prescribed code output in response to the predetermined operation matches up with the code stored in the code storage part, and a suitability judgment part for judging whether or not the prescribed code is suitable for storage in the code storage part. Further, the present invention includes a fourth code storage controller which rewrites the code stored in the code storage part to the prescribed code when the prescribed code is judged not to match up with the code stored in the code storage part by the matching judgment part and is judged to be suitable for storage in the code storage part by the suitability judgment part in any of the first through seventh aspects of the remote starting control systems.

By the way, if rewriting of the code stored in the code storage part cannot be conducted at all, inconvenience is caused, for example, when the starting control device which permits the starting of the machine (such as an engine) is replaced and the unique code of the vehicle is changed.

In the eighth aspect of the remote starting control system, the rewriting of the code stored in the code storage part is conducted, when the prescribed code output in response to the predetermined operation is judged not to match up with the code stored in the code storage part and is judged to be suitable for storage in the code storage part. Therefore, even if the starting control device is replaced and the unique code of the vehicle is changed, the system can be adaptable to the change.

A ninth aspect of a remote starting control system according to the present invention is characterized by the code storage part which can hold multiple codes, comprising an entry judgment part for judging whether or not the prescribed code output in response to the predetermined operation has been stored in the code storage part, a suitability judgment part for judging whether or not the prescribed code is suitable for storage in the code storage part. Further, the invention includes a fifth code storage controller which additionally stores the prescribed code in the code storage part when it is judged that the prescribed code has not been stored in the code storage part by the entry judgment part and that the prescribed code is suitable for storage in the code storage part by the suitability judgment part in any of the first through seventh aspects of the remote starting control systems.

In the ninth aspect of the remote starting control system, the prescribed code output in response to the predetermined operation is additionally stored in the code storage part, when it is judged that the prescribed code has not been stored in the code storage part and that the prescribed code is suitable for storage in the code storage part. Therefore, since multiple different proper codes can be stored therein, it is possible to widen the applicability thereof.

DETAILED DESCRIPTION OF THE INVENTION

Figure 1:
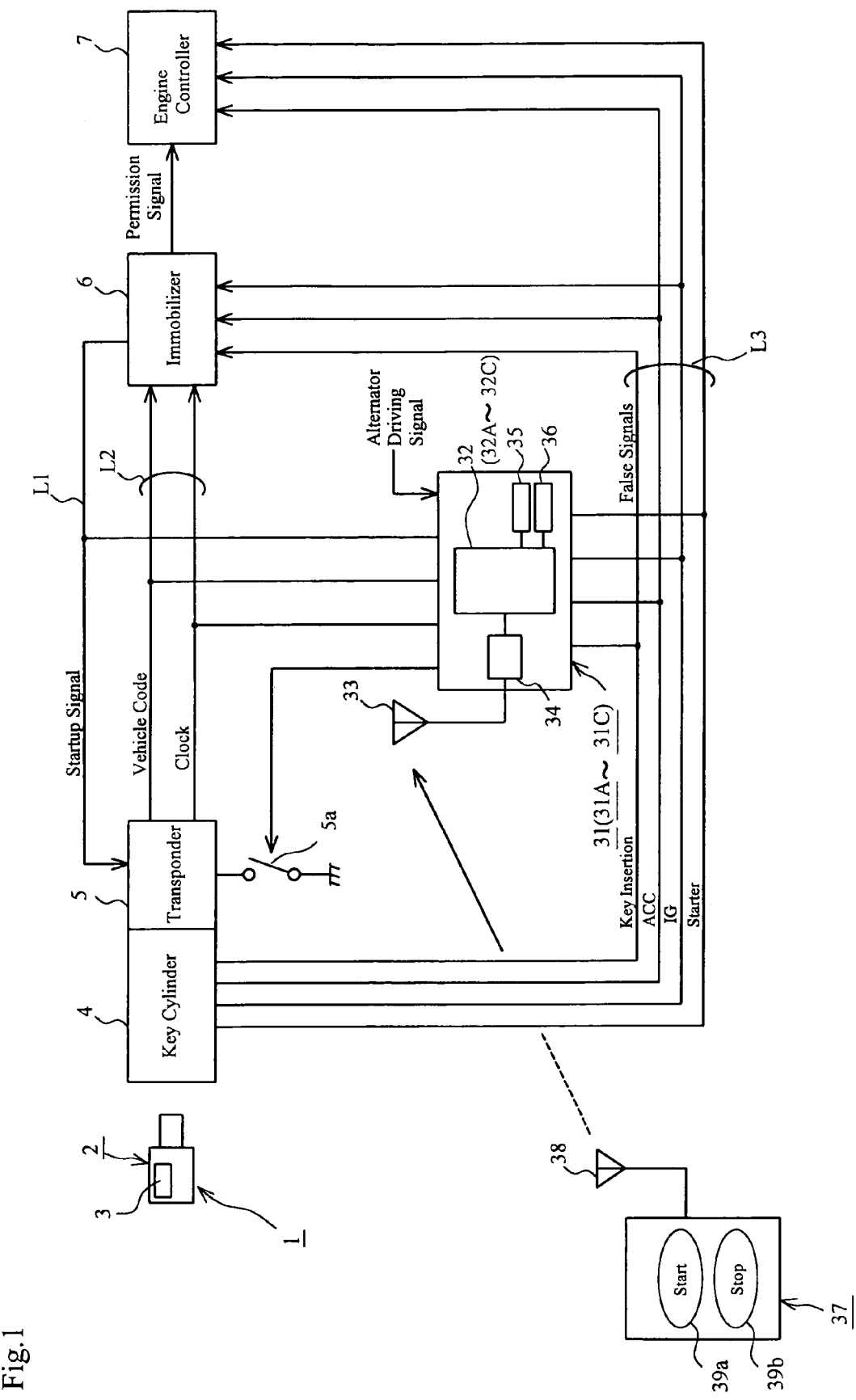
FIG. 1 is a block diagram schematically showing the principal part of an engine starting system in which a remote starting control system according to a first embodiment of the present invention is adopted.
Figure 8:
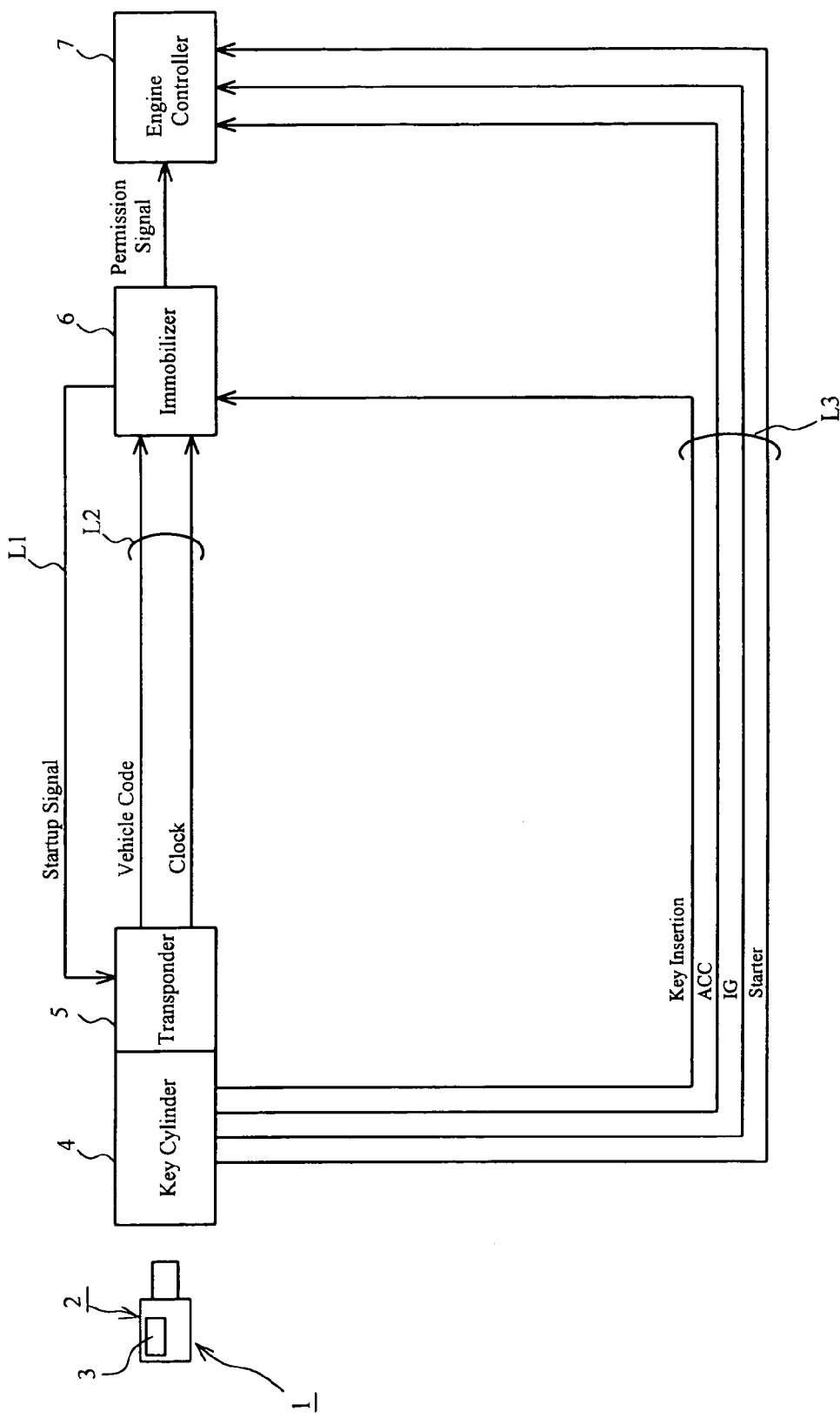
FIG. 8 is a block diagram schematically showing the principal part of a conventional engine starting system.
Figure 9:
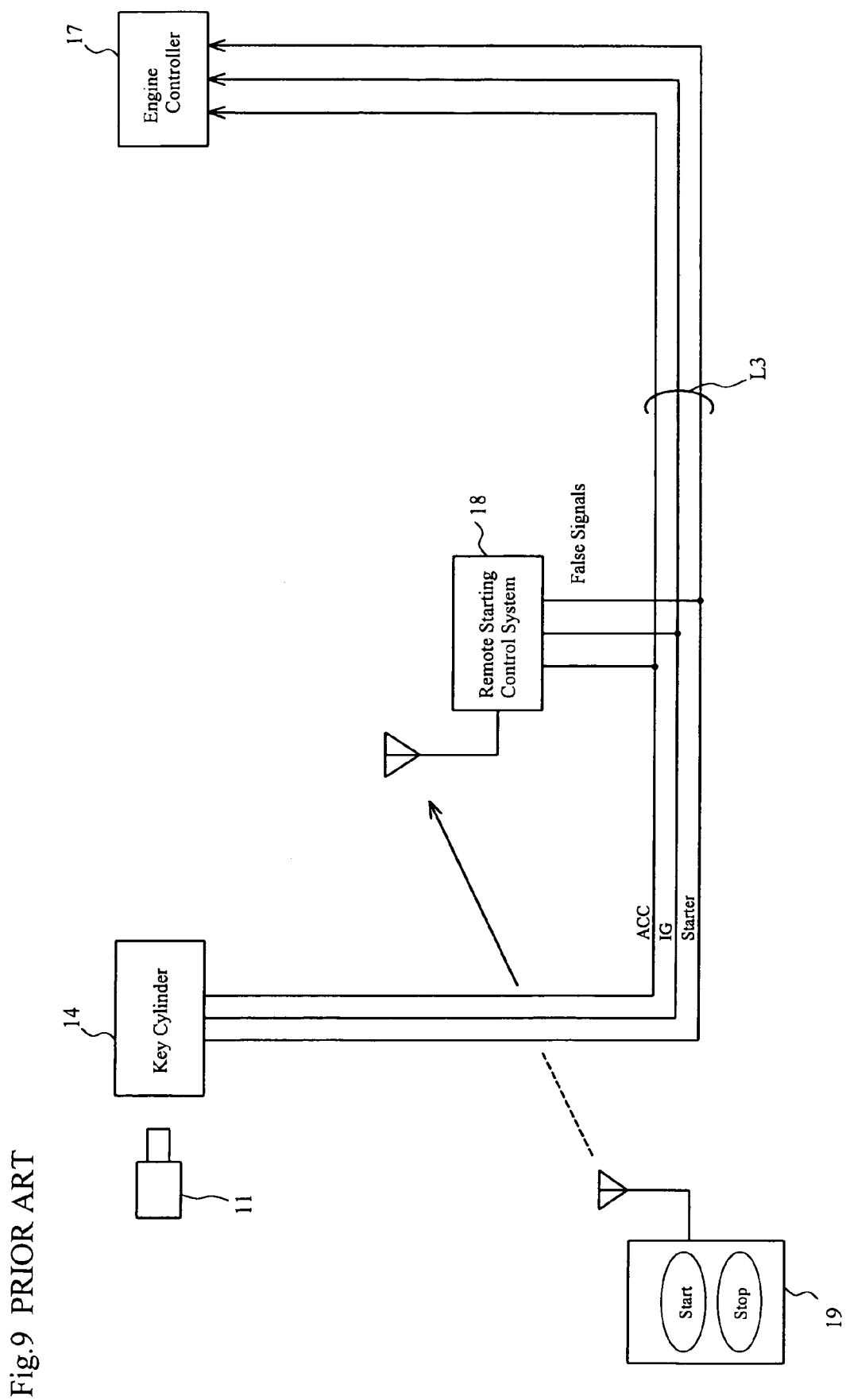
FIG. 9 is a block diagram schematically showing the principal part of an engine starting system in which a conventional remote starting control system is adopted.

The preferred embodiments of the remote starting control system according to the present invention are described below by reference to the Figures of the drawings. FIG. 1 is a block diagram schematically showing the principal part of an engine starting system in which a remote starting control system according to a first embodiment is adopted. Here, the same components as those in the engine starting system shown in FIG. 8 are similarly marked.

The engine starting system comprises an ignition key 1 having a chip 3 which stores a unique code of a vehicle and has a transmitting feature built into its grip portion 2, a key cylinder 4, a transponder 5 installed on the key cylinder 4, an immobilizer 6 which stores a specific code of a vehicle and has an antitheft function, an engine controller 7 for controlling engine starting and the like, a remote starting control system 31 and a portable transmitter 37.

The remote starting control system 31 comprises a microcomputer 32, an antenna 33 and a receiving part 34 for receiving signals sent from the portable transmitter 37, an EEPROM 35 in which a remote-control ID code is stored and an EEPROM 36 for storing the unique code of the vehicle. The remote starting control system 31 can capture alternator driving signals used for judging whether an engine has been started or not, or can control the opening/closing of a switch 5a connected to the transponder 5.

The portable transmitter 37 comprises a microcomputer (not shown), an antenna 38 for sending a prescribed signal to the remote starting control system 31, an EEPROM (not shown) in which a remote-control ID code is stored, a button switch 39a for instructing a start of the engine from a remote place and a button switch 39b for instructing a stop of the engine therefrom.

The microcomputer of the portable transmitter 37 sends a signal comprising the remote-control ID code and an instruction code of an engine start through the antenna 38 to the outside when the button switch 39a is pressed, while the microcomputer thereof sends a signal comprising the remote-control ID code and an instruction code of an engine stop through the antenna 38 to the outside when the button switch 39b is pressed.

When the ignition key 1 is inserted into the key cylinder 4 by a vehicle driver (or the ignition key 1 is turned to the ACC output position or the IG output position of an ignition switch), a key insertion detection signal becomes high. When receiving the signal, the immobilizer 6 sends a pulsed startup signal through a signal line L1 to the transponder 5 to request the unique code of the vehicle.

When receiving the startup signal, the transponder 5 conducts radio communication with the chip 3 of the ignition key 1 inserted in the key cylinder 4 to acquire the code stored in the chip 3, and outputs the acquired code with a clock signal through a signal line L2 to the immobilizer 6.

The immobilizer 6 judges whether or not the code transmitted from the transponder 5 matches up with the previously stored unique code of the vehicle. When it is judged that these codes are the same (or that the proper ignition key 1 is inserted in the key cylinder 4), the immobilizer 6 gives a permission signal for permitting an engine start to the engine controller 7.

On the other hand, when the code transmitted from the transponder 5 does not match up with the unique code of the vehicle, the startup signal is transmitted again to the transponder 5 after a short interval. Here, this operation is repeated until both the codes match up with each other (however, the upper limit is preset).

The engine controller 7 conducts engine control such as fuel and ignition timing, when receiving a starter signal output from the key cylinder 4 after receiving the permission signal. On the contrary, the engine controller 7 does not conduct the engine control when receiving the starter signal without receiving the permission signal.

As described above, unless the code stored in the chip 3 of the ignition key 1 is identical to the unique code of the vehicle stored in the immobilizer 6, it is impossible to start the engine. Therefore, the engine cannot be started with an improper ignition key or direct coupling of the ignition switch, so that vehicle theft can be prevented. Here, the remote starting control system 31 is connected to the signal lines L1-L3, so that signals of each kind can be sent therefrom or received thereby through these signal lines L1-L3.

The processing operation ①-1 (main routine) performed by the microcomputer 32 in the remote starting control system 31 according to the first embodiment is described below by reference to a flow chart shown in FIG. 2. First, a flag, a counter and the like are cleared by initialization (Step 1), and then, whether a signal was received through the antenna 33 and the receiving part 34 or not is judged (Step 2). When it is judged that a signal was received, whether an ID code contained in the received signal matches up with the remote-control ID code stored in the EEPROM 35 or not is judged (Step 3).

When it is judged that the ID code contained in the received signal is identical to the remote-control ID code (or that a signal transmitted from the portable transmitter 37 an authorized driver carries with him/her was received), whether an instruction code of an engine start is included in the signal or not is judged (Step 4). When it is judged that the instruction code of an engine start is included in the signal, the operation goes to Step 5, wherein the processing for starting the engine is conducted (for details, see FIG. 3). Then, it goes to Step 8, wherein the below-described program processing is conducted. And it proceeds to Step 9, wherein the other processing is conducted, and returns to Step 2.

On the other hand, when it is judged that the instruction code of an engine start is not included in the signal, whether an instruction code of an engine stop is included in the signal or not is judged (Step 6). When it is judged that the instruction code of an engine stop is included in the signal, the processing of an engine stop, whereby all of a key insertion signal, an ACC signal and an IG signal are made OFF, is conducted so as to stop the engine (Step 7). Here, when it is judged that neither the instruction code of an engine start nor that of an engine stop is included in the signal, the operation moves to Step 8 at once.

When it is judged that no signal has been received in Step 2, or when it is judged that a signal was received, but that the received signal was not a signal transmitted from the portable transmitter 37 the authorized driver carries with him/her in Step 3, the processing of an engine start or an engine stop is not required, so that it moves to Step 8 at once.

The processing operation ①-1$a$ (engine start processing in Step 5 of FIG. 2) performed by the microcomputer 32 in the remote starting control system 31 according to the first embodiment is described below by reference to a flow chart shown in FIG. 3. Here, the processing operation ①-1 $a$ is an operation to be conducted when an engine start is instructed from a remote place by operating the portable transmitter 37.

First, a flag $f_1$ for remote starting is changed to 1 (Step 11), and then, false signals corresponding to a key insertion detection signal, an ACC signal and an IG signal output when the proper ignition key 1 is turned to the IG signal output position are supplied to the signal line L3 of the ignition switch. These false signals are transmitted to the immobilizer 6 to activate the immobilizer 6 (Step 12) and close the switch 5$a$ for cutting off the power to the transponder 5 so as to inhibit the activation of the transponder 5 (Step 13).

Whether a startup signal output from the activated immobilizer 6 was received or not is judged (Step 14). When it is judged that the startup signal has not been received, the operation returns to Step 14, wherein the transmission of the startup signal is waited for. On the other hand, when it is judged that the startup signal was received, a counter c is set at 0 (Step 15), and then, the code stored in the EEPROM 36 is sent through the signal line L2 to the immobilizer 6 (Step 16). After that, whether the startup signal was received again from the immobilizer 6 within a prescribed period (e.g. 2 seconds) or not is judged (Steps 17 and 18). The startup signal is originally transmitted to the transponder 5, but since the activation of the transponder 5 is inhibited here, no particular problem will be caused.

When receiving the code sent through the signal line L2, the immobilizer 6 judges whether the received code (or the code stored in the EEPROM 36) matches up with the previously entered unique code of the vehicle or not. When judging that these codes are the same, the immobilizer 6 transmits a permission signal for permitting an engine start to the engine controller 7 and does not resend the startup signal thereafter.

On the other hand, when it is judged that the received code is not identical to the unique code of the vehicle, resending of the startup signal is repeated.

As a result, that the startup signal is not received again within 2 seconds after the code stored in the EEPROM 36 was transmitted indicates that the code stored in the EEPROM 36 was identical to the unique code of the vehicle, so that the permission signal was sent from the immobilizer 6 to the engine controller 7.

On the contrary, that the startup signal is received again within 2 seconds after the code stored in the EEPROM 36 was transmitted indicates that no code matching up with the unique code of the vehicle has been entered in the EEPROM 36, or that (even if a code matching up with the unique code of the vehicle has been entered in the EEPROM 36) the unmatching thereof was determined because of noise or the like in the immobilizer 6.

When it is judged that the startup signal is not received again within 2 seconds from the immobilizer 6 (or that the code stored in the EEPROM 36 was identical to the unique code of the vehicle and the permission signal was transmitted from the immobilizer 6 to the engine controller 7) in Steps 17 and 18, the switch 5$a$ is opened to reset the cutting of the power to the transponder 5 (Step 19).

A false signal corresponding to a starter signal output when the ignition key 1 is turned to the starter output position is continuously supplied for a prescribed period (e.g., 2 seconds) to the signal line L3 so as to be transmitted to the engine controller 7 (Step 20).

Then, after a waiting time of a prescribed period (e.g., 4 seconds) (Step 21), whether the engine has been started or not is judged based on an alternator driving signal (Step 22). When it is judged that the engine has been started, the flag $f_1$ for remote starting is changed to 0 (Step 23). On the other hand, when it is judged that the engine has not been started, the operation returns to Step 20, wherein the false signal corresponding to the starter signal is transmitted again.

By the way, when it is judged that the startup signal was received again from the immobilizer 6 in Step 17, the code identical to the unique code of the vehicle has not reached the immobilizer 6. Therefore, 1 is added to the counter c (Step 24), and then, whether or not the counter c to which 1 was added reads a given value c' (e.g., 10 times) or more is judged (Step 25).

When the counter c is judged to read less than the given value c', it returns to Step 16, wherein the code stored in the EEPROM 36 is transmitted again to the immobilizer 6. On the other hand, when it is judged that the counter c reads the given value c' or more, or that the matching of the code stored in the EEPROM 36 has not been determined in the immobilizer 6 though it was transmitted c' times, it is considered that the unique code of the vehicle has not been entered in the EEPROM 36, or that the code has not normally reached the immobilizer 6 because of the effects of noise and the like. And it goes to Step 23 at once, wherein the flag $f_1$ for remote starting is changed to 0, and the processing operation ①-1$a$ is ended.

Figure 4:
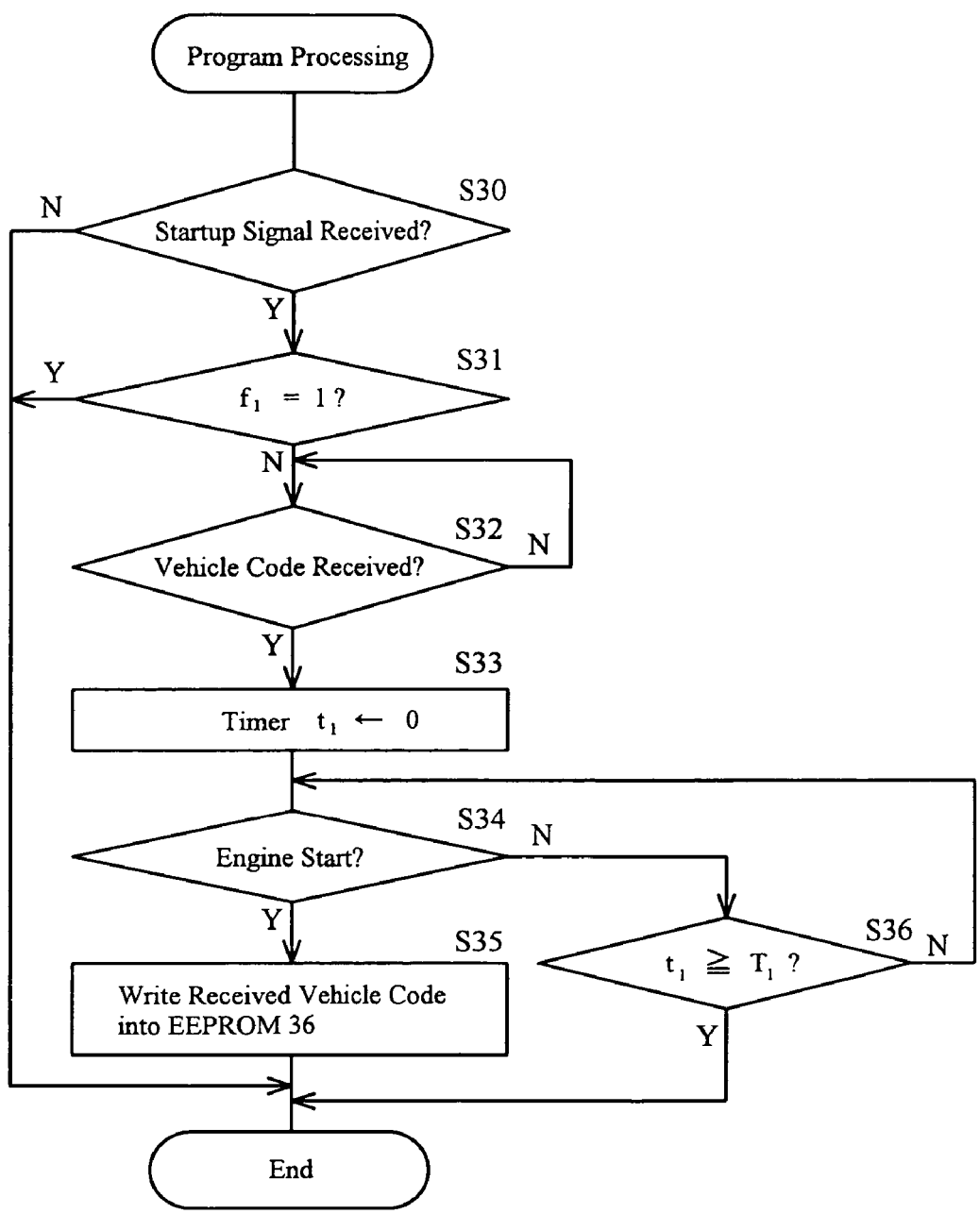
FIG. 4 is a flow chart showing the processing operation performed by the microcomputer in the remote starting control system according to the first embodiment.

The processing operation ①-2 (program processing in Step 8 of FIG. 2) performed by the microcomputer 32 in the remote starting control system 31 according to the first embodiment is described below by reference to a flow chart shown in FIG. 4. Here, the processing operation ①-2 is an operation for writing the unique code of the vehicle entered in the chip 3 of the proper ignition key 1 into the EEPROM 36.

First, whether the startup signal supplied to the signal line L1 from the immobilizer 6 was received or not is judged (Step 30). When it is judged that the startup signal was received, the operation goes to Step 31, while the processing operation ①-2 is ended at once when it is judged that the startup signal has not been received.

The startup signal is supplied to the signal line L1 from the immobilizer 6 in the following two cases:

a) a case wherein the ignition key 1 is inserted into the key cylinder 4 by the driver (or the ignition key 1 is turned to the ACC output position or the IG output position), and a key insertion detection signal or the like is supplied to the signal line L3 from the key cylinder 4; and b) a case wherein the button switch 39a of the portable transmitter 37 is pressed by the driver, and a false signal corresponding to a key insertion detection signal or the like is supplied to the signal line L3 from the remote starting control system 31. In this case, the flag $f_1$ for remote starting turns 1 (see Steps 11 and 12 of FIG. 3).

When it is judged that the startup signal was received in Step 30, whether the flag $f_1$ for remote starting is 1 or not is judged (Step 31). When it is judged that the flag $f_1$ for remote starting is 1, or that the ignition key 1 is not inserted in the key cylinder 4, the processing operation ①-2 is ended at once.

On the other hand, when it is judged that the flag $f_1$ for remote starting is not 1, or that the ignition key 1 is inserted in the key cylinder 4, whether the code supplied to the signal line L2 from the transponder 5 (or the code the transponder 5 obtained by conducting radio communication with the chip 3 of the ignition key 1) was received or not is judged (Step 32).

When it is judged that the code has not been received, it returns to Step 32, wherein the transmission of the code is waited for. On the other hand, when it is judged that the code was received, a timer $t_1$ is set at 0 and started up (Step 33), and whether the engine has been started or not is judged based on an alternator driving signal (Step 34).

The code supplied from the transponder 5 to the signal line L2 is received not only by the remote starting control system 31 but also by the immobilizer 6. Therefore, in cases where the code is identical to the unique code of the vehicle (or the proper ignition key 1 is inserted in the key cylinder 4), the permission signal is given to the engine controller 7.

As a result, when the proper ignition key 1 is turned to the starter output position, the engine is started. In other words, if the starting of the engine can be detected, it can be judged that the code is the unique code of the vehicle.

Accordingly, when it is judged that the engine has been started in Step 34, the code is judged to be the unique code of the vehicle, and the code transmitted from the transponder 5 (the unique code of the vehicle) is stored in the EEPROM 36 (Step 35).

On the other hand, when it is judged that the engine has not been started, whether the timer $t_1$ has counted to a prescribed period $T_1$ (e.g. 6 seconds) or not is judged (Step 36). When it is judged that the timer $t_1$ has not counted to the prescribed period $T_1$, the operation returns to Step 34, wherein whether the engine has been started or not is judged again. On the other hand, when it is judged that the timer $t_1$ has counted to the prescribed period $T_1$, the processing operation ①-2 is ended at once without writing the code into the EEPROM 36.

Here, cases where the engine is not started within the prescribed period $T_1$ are a case where the proper ignition key 1 is not inserted in the key cylinder 4, and a case where the proper ignition key 1 is not turned to the starter output position before an elapse of the prescribed period $T_1$, even if the proper ignition key 1 is inserted into the key cylinder 4.

Here, a case where the received code is stored in the EEPROM 36 when the engine was started was described. However, in another embodiment, each received code may be stored in the EEPROM 36 when the code is received without regard to engine starting. In that case, there is only a need to delete the processing operations in Steps 33, 34 and 36.

Using the remote starting control system according to the first embodiment, the unique code of the vehicle output in response to an insertion of the ignition key 1 into the key cylinder 4 is stored in the EEPROM 36. When a start instruction of the engine by remote control is received, the code stored in the EEPROM 36 (or the unique code of the vehicle) is supplied to the immobilizer 6.

Accordingly, even with the start instruction of the engine by remote control, the unique code of the vehicle can be supplied to the immobilizer 6, similarly to the case of the insertion of the ignition key 1 into the key cylinder 4, and a permission of an engine start can be given from the immobilizer 6. Thus, even if the ignition key 1 is not inserted into the key cylinder 4 to be turned, the engine or the like can be started by remote control.

When the unique code of the vehicle is output in response to an insertion of the ignition key 1 into the key cylinder 4, the unique code of the vehicle is automatically stored in the EEPROM 36. Therefore, mode conversion is not required, differently from the invention disclosed in the Publicly-known Example 1, so that the unique code of the vehicle can be stored in the EEPROM 36 by performing only a regular starting operation without giving the user trouble. Accordingly, an operating part for conducting the mode conversion should not be required, resulting in a reduction in cost.

Furthermore, using the remote starting control system according to the first embodiment, whether the engine has been started or not is confirmed when the code output in response to the insertion of the ignition key 1 into the key cylinder 4 is stored in the EEPROM 36, so that it is possible to prevent a wrong code from being stored therein.

The engine starting system in which a remote starting control system according to a second embodiment is adopted is described below. Here, since the construction of the engine starting system is similar to that of the engine starting system shown in FIG. 1, except for the remote starting control system 31 and the microcomputer 32 constituting the remote starting control system 31, a remote starting control system and a microcomputer are differently marked and others are not described here.

Figure 2:
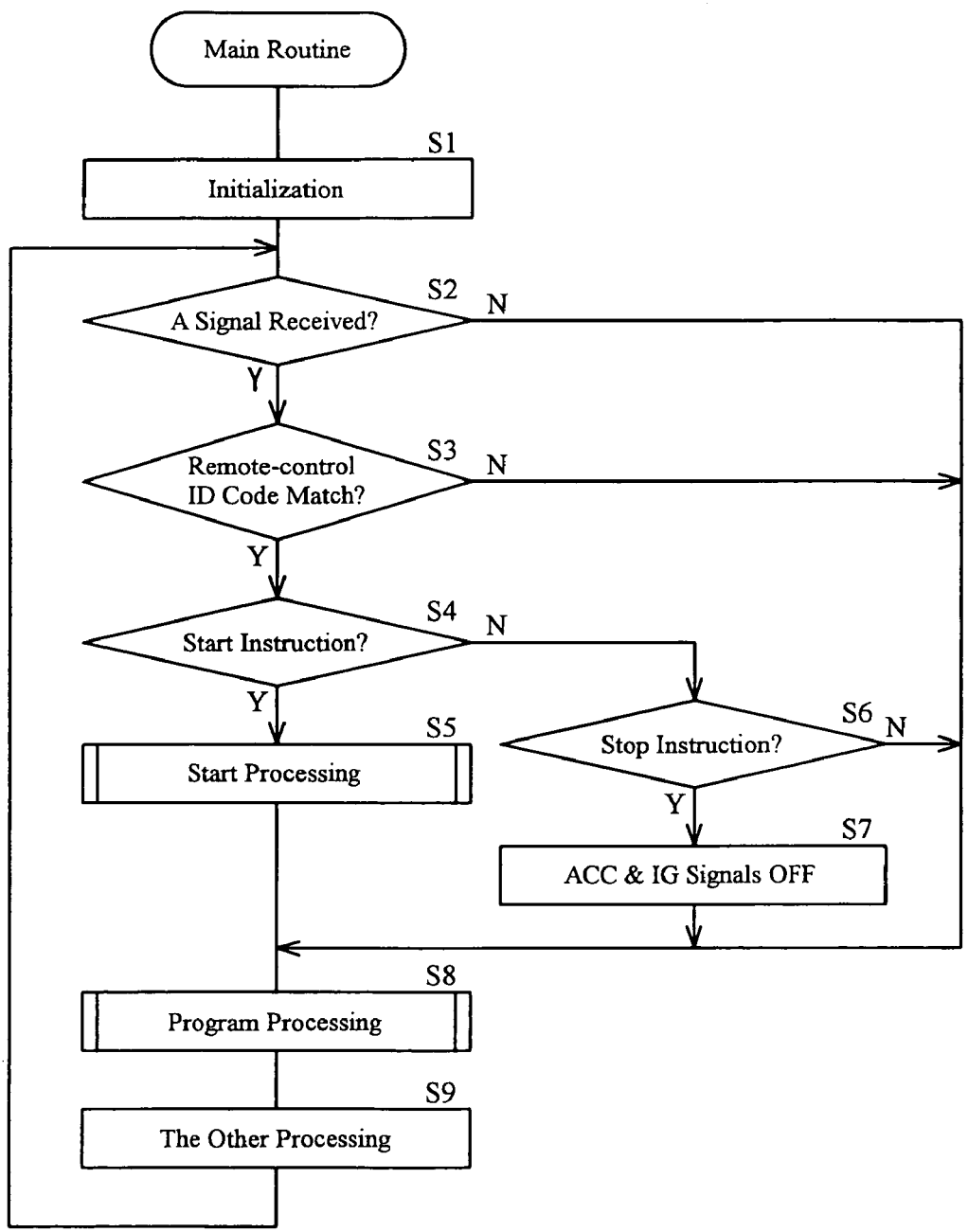
FIG. 2 is a flow chart showing the processing operation performed by a microcomputer in the remote starting control system according to the first embodiment.
Figure 3:
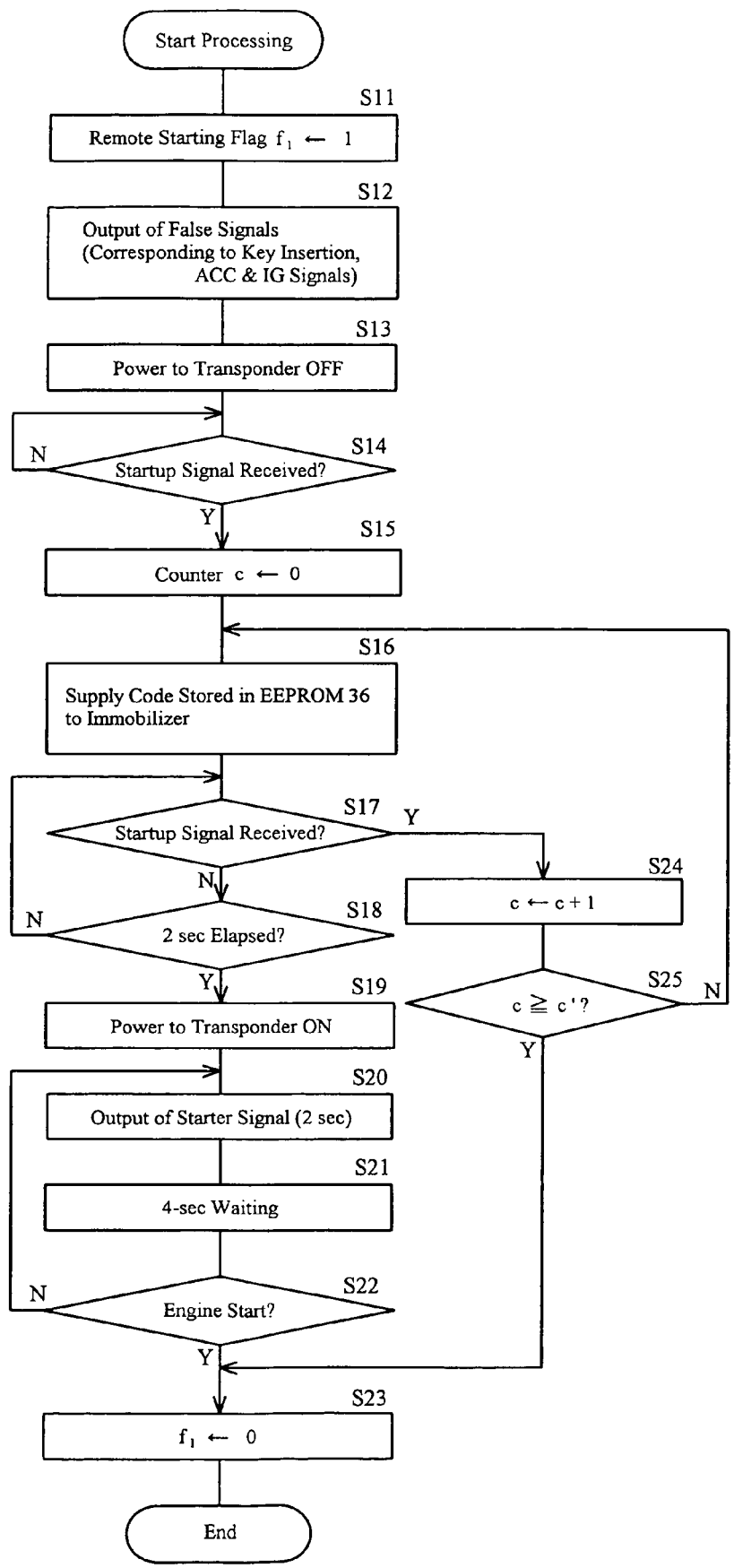
FIG. 3 is a flow chart showing the processing operation performed by the microcomputer in the remote starting control system according to the first embodiment.

The processing operation ②-1 (main routine) and the processing operation ②-1a (engine start processing) performed by the microcomputer 32A in the remote starting control system 31A according to the second embodiment are the same as the processing operation ①-1 shown in FIG. 2 and the processing operation ①-1a shown in FIG. 3, respectively, so that those are not described here.

Figure 5:
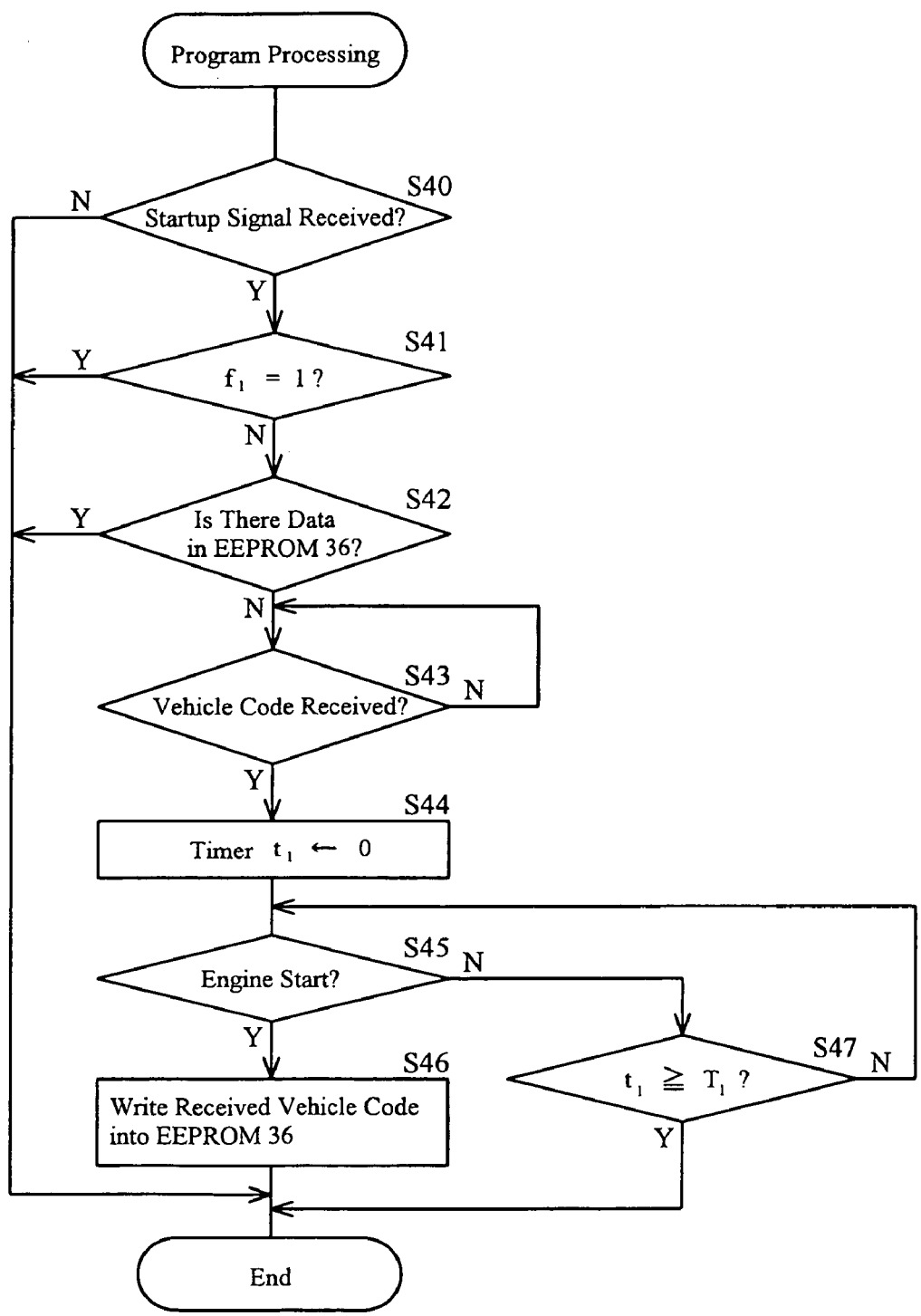
FIG. 5 is a flow chart showing the processing operation performed by a microcomputer in the remote starting control system according to a second embodiment.

The processing operation ②-2 performed by the microcomputer 32A in the remote starting control system 31A according to the second embodiment is described below by reference to a flow chart shown in FIG. 5. Here, the processing operation ②-2 is a variant example of the program processing in Step 8 of FIG. 2, and it is an operation for writing a unique code of a vehicle entered in a chip 3 of a proper ignition key 1 into an EEPROM 36.

Whether a startup signal supplied to a signal line L1 from an immobilizer 6 was received or not is judged (Step 40). When it is judged that the startup signal was received, the operation goes to Step 41, while the processing operation ②-2 is ended at once when it is judged that the startup signal has not been received.

The startup signal is supplied to the signal line L1 from the immobilizer 6 in the following two cases, as described above:

a) a case wherein the ignition key 1 is inserted into the key cylinder 4 by the driver (or the ignition key 1 is turned to the ACC output position or the IG output position), and a key insertion detection signal or the like is supplied to a signal line L3 from the key cylinder 4; and b) a case wherein a button switch 39a of a portable transmitter 37 is pressed by the driver, and a false signal corresponding to a key insertion detection signal or the like is supplied to the signal line L3 from the remote starting control system 31A. In this case, a flag $f_1$ for remote starting turns 1 (see Steps 11 and 12 of FIG. 3).

When it is judged that the startup signal was received in Step 40, whether the flag $f_1$ for remote starting is 1 or not is judged (Step 41). When it is judged that the flag $f_1$ for remote starting is 1, or that the ignition key 1 is not inserted in the key cylinder 4, the processing operation ②-2 is ended at once.

On the other hand, when it is judged that the flag $f_1$ for remote starting is not 1, or that the ignition key 1 is inserted in the key cylinder 4, whether some data has been already stored in the EEPROM 36 or not is judged (Step 42). When it is judged that some data has been stored in the EEPROM 36, or that the EEPROM 36 is not in a clear state (there is a high possibility that a unique code of a vehicle has been entered therein), the processing operation ②-2 is ended at once in order not to rewrite the code to a wrong code. On the other hand, when it is judged that the EEPROM 36 is in a clear state, whether a code supplied to a signal line L2 from a transponder 5 (or a code the transponder 5 obtained by conducting radio communication with the chip 3 of the ignition key 1) was received or not is judged (Step 43).

When it is judged that the code has not been received, it returns to Step 43, wherein the transmission of the code is waited for. On the other hand, when it is judged that the code was received, a timer $t_1$ is set at 0 and started up (Step 44), and then, whether an engine has been started or not is judged based on an alternator driving signal (Step 45).

Since the code supplied to the signal line L2 from the transponder 5 is received not only by the remote starting control system 31A but also by the immobilizer 6, the permission signal is given to an engine controller 7 when the code is identical to the unique code of the vehicle (or when the proper ignition key 1 is inserted in the key cylinder 4).

As a result, in cases where the proper ignition key 1 is turned to the starter output position, the engine is started. In other words, if the starting of the engine can be detected, it can be judged that the code is the unique code of the vehicle Therefore, when it is judged that the engine has been started in Step 45, the code is judged to be the unique code of the vehicle, and the code transmitted from the transponder 5 (the unique code of the vehicle) is stored in the EEPROM 36 (Step 46).

On the other hand, when it is judged that the engine has not been started, whether the timer $t_1$ has counted to a prescribed period $T_1$ (e.g. 6 seconds) or not is judged (Step 47). When it is judged that the timer $t_1$ has not counted to the prescribed period $T_1$, it returns to Step 45, wherein whether the engine has been started or not is judged again. On the other hand, when it is judged that the timer $t_1$ has counted to the prescribed period $T_1$, the processing operation ②-2 is ended at once without writing the code into the EEPROM 36.

Using the remote starting control system according to the second embodiment, only when the EEPROM 36 is in a clear state (for example, in a state just after the system is mounted on a vehicle and connected to a battery, or in a state just after a supply of power), the code output in response to an insertion of the ignition key 1 into the key cylinder 4 is stored in the EEPROM 36. In other words, once the code is written into the EEPROM 36 after the supply of power, the codes output in response to insertions of the ignition key 1 into the key cylinder 4 thereafter are not stored in the EEPROM 36. As a result, it is possible to prevent an improper code or a wrong code from being written into the EEPROM 36.

The engine starting system in which a remote starting control system according to a third embodiment is adopted is described below. Here, since the construction of the engine starting system is similar to that of the engine starting system shown in FIG. 1 except for the remote starting control system 31 and the microcomputer 32 constituting the remote starting control system 31, a remote starting control system and a microcomputer are differently marked and others are not described here.

The processing operation ③-1 (main routine) and the processing operation ③-1a (engine start processing) performed by the microcomputer 32B in the remote starting control system 31B according to the third embodiment are the same as the processing operation ①-1 shown in FIG. 2 and the processing operation ①-1a shown in FIG. 3, respectively, so that those are not described here.

Figure 6:
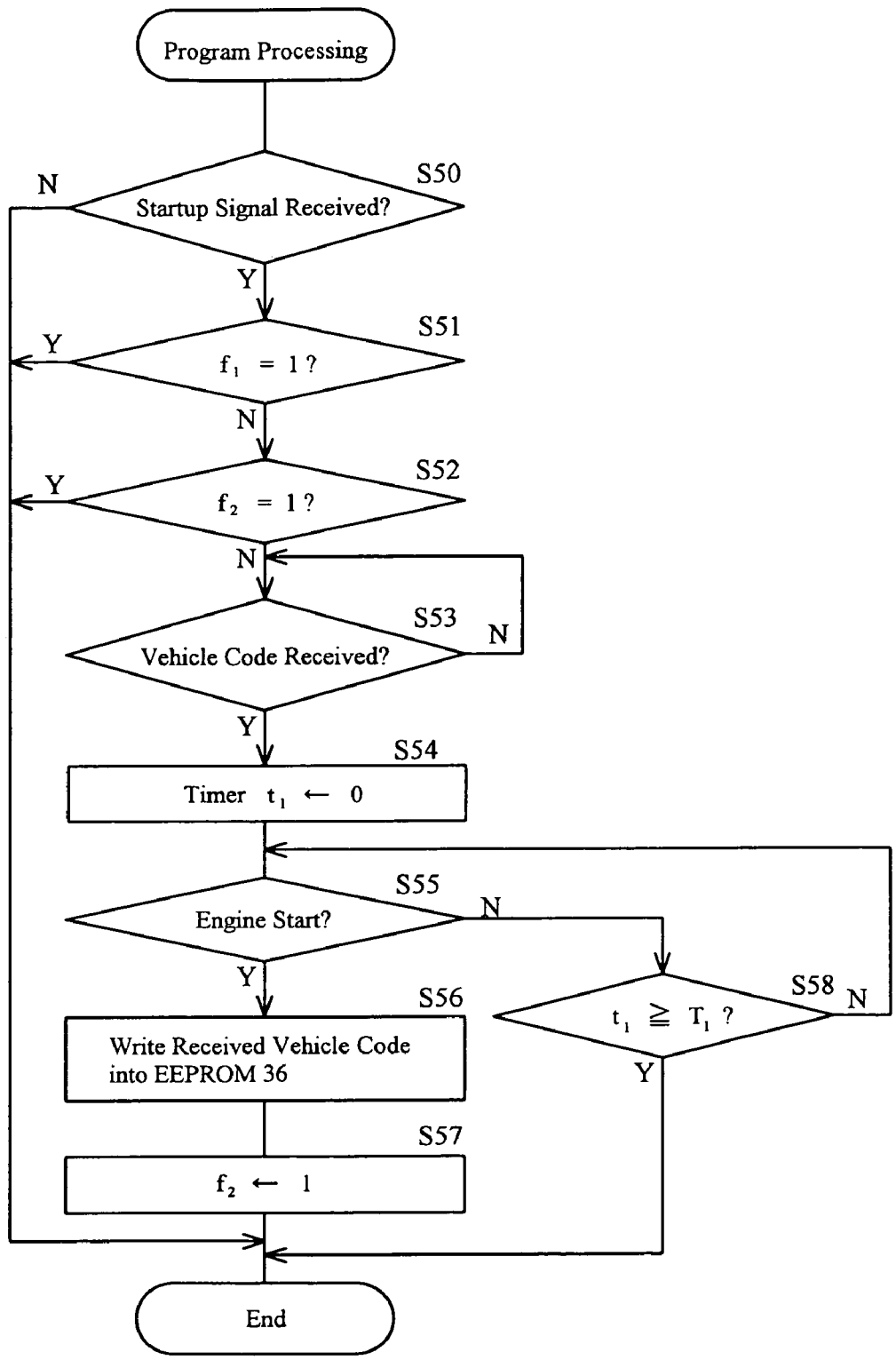
FIG. 6 is a flow chart showing the processing operation performed by a microcomputer in the remote starting control system according to a third embodiment.

The processing operation ③-2 performed by the microcomputer 32B in the remote starting control system 31B according to the third embodiment is described below by reference to a flow chart shown in FIG. 6. Here, the processing operation ③-2 is a variant example of the program processing in Step 8 of FIG. 2, and it is an operation for writing a unique code of a vehicle entered in a chip 3 of a proper ignition key 1 into an EEPROM 36.

Whether a startup signal supplied to a signal line L1 from an immobilizer 6 was received or not is judged (Step 50). When it is judged that the startup signal was received, the operation goes to Step 51, while the processing operation ③-2 is ended at once when it is judged that the startup signal has not been received.

When it is judged that the startup signal was received in Step 50, whether a flag $f_1$ for remote starting is 1 or not is judged (Step 51). When it is judged that the flag $f_1$ for remote starting is 1, or that the ignition key 1 is not inserted in a key cylinder 4, the processing operation ③-2 is ended at once.

On the other hand, when it is judged that the flag $f_1$ for remote starting is not 1, or that the ignition key 1 is inserted in the key cylinder 4, whether a flag $f_2$ for writing which indicates that a code was written into an EEPROM 36 is 1 or not is judged (Step 52). When it is judged that the flag $f_2$ for writing is 1, or that writing of the code into the EEPROM 36 was conducted (there is a high possibility that a unique code of a vehicle has been entered therein), the processing operation ③-2 is ended at once in order not to rewrite the code to a wrong code. On the other hand, when it is judged that the flag $f_2$ for writing is not 1, whether a code supplied to a signal line L2 from a transponder 5 (or a code the transponder 5 obtained by conducting radio communication with the chip 3 of the ignition key 1) was received or not is judged (Step 53).

When it is judged that the code has not been received, it returns to Step 53, wherein the transmission of the code is waited for. On the other hand, when it is judged that the code was received, a timer $t_1$ is set at 0 and started up (Step 54), and then, whether an engine has been started or not is judged based on an alternator driving signal (Step 55).

Since the code supplied to the signal line L2 from the transponder 5 is received not only by the remote starting control system 31B but also by the immobilizer 6, the permission signal is given to an engine controller 7 when the code is identical to the unique code of the vehicle (or when the proper ignition key 1 is inserted in the key cylinder 4).

As a result, in cases where the proper ignition key 1 is turned to the starter output position, the engine is started. In other words, if the starting of the engine can be detected, it can be judged that the code is the unique code of the vehicle.

Therefore, when it is judged that the engine has been started in Step 55, it is judged that the code is the unique code of the vehicle, the code transmitted from the transponder 5 (the unique code of the vehicle) is stored in the EEPROM 36 (Step 56), and then, the flag $f_2$ for writing is changed to 1 (Step 57).

On the other hand, when it is judged that the engine has not been started, whether the timer $t_1$ has counted to a prescribed period $T_1$ (e.g., 6 seconds) or not is judged (Step 58). When it is judged that the timer $t_1$ has not counted to the prescribed period $T_1$, it returns to Step 55, wherein whether the engine has been started or not is judged again. On the other hand, when it is judged that the timer $t_1$ has counted to the prescribed period $T_1$, the processing operation ③-2 is ended at once without writing the code into the EEPROM 36.

Using the remote starting control system according to the third embodiment, only in a state where the flag $f_2$ for writing is 0 (for example, in a state just after the system is mounted on a vehicle and connected to a battery, or in a state just after a supply of power), a code output in response to an insertion of the ignition key 1 into the key cylinder 4, being suitable for storage in the EEPROM 36 (or a code which can allow the engine to start) is stored in the EEPROM 36. As a result, it is possible to prevent an improper code or a wrong code from being written into the EEPROM 36.

The engine starting system in which a remote starting control system according to a fourth embodiment is adopted is described below. Here, since the construction of the engine starting system is similar to that of the engine starting system shown in FIG. 1 except for the remote starting control system 31 and the microcomputer 32 constituting the remote starting control system 31, a remote starting control system and a microcomputer are differently marked and others are not described below.

The processing operation ④-1 (main routine) and the processing operation ④-1a (engine start processing) performed by the microcomputer 32C in the remote starting control system 31C according to the fourth embodiment are the same as the processing operation ①-1 shown in FIG. 2 and the processing operation ①-1a shown in FIG. 3, respectively, so that those are not described here.

Figure 7:
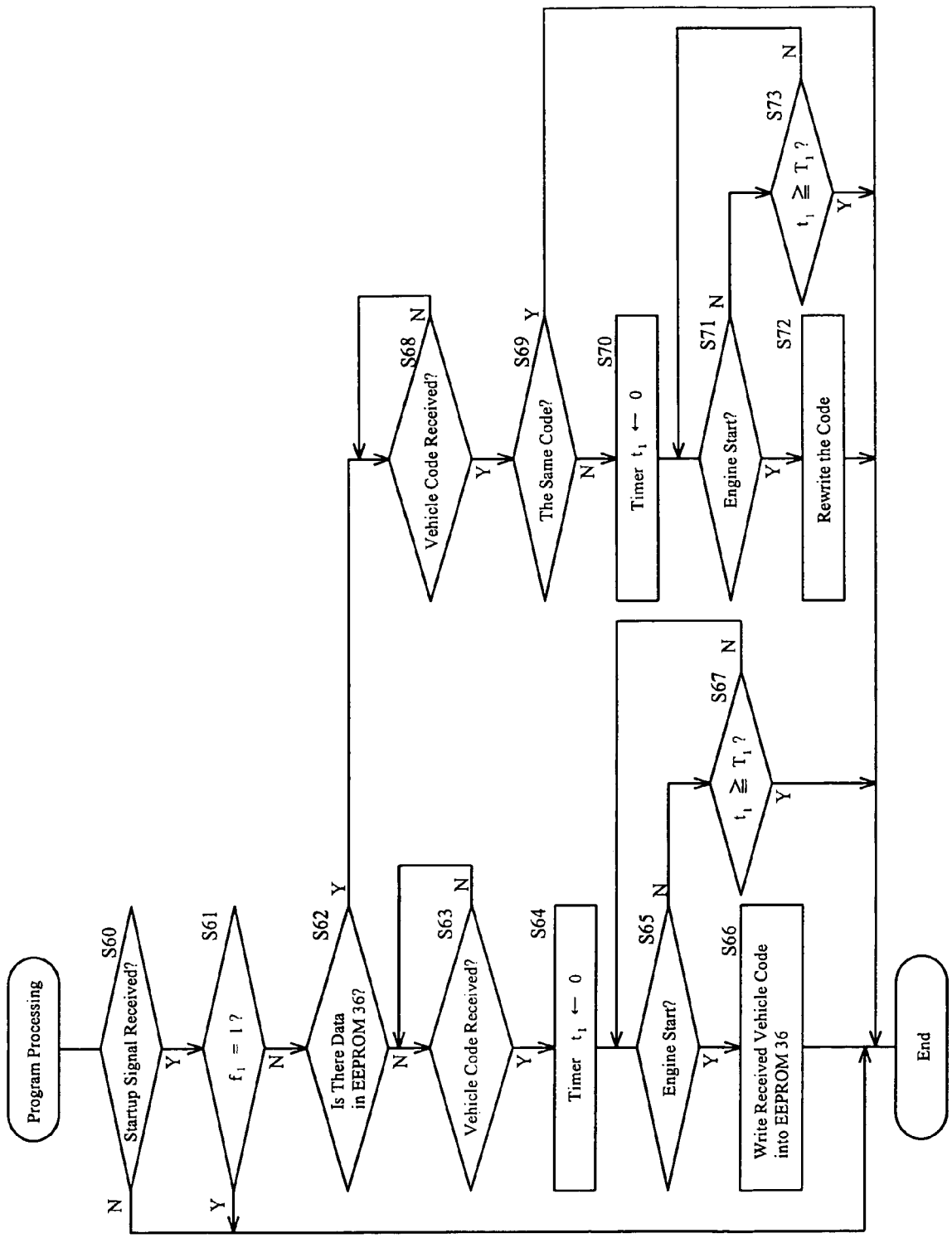
FIG. 7 is a flow chart showing the processing operation performed by a microcomputer in the remote starting control system according to a fourth embodiment.

The processing operation ④-2 performed by the microcomputer 32C in the remote starting control system 31C according to the fourth embodiment is described below by reference to a flow chart shown in FIG. 7. Here, the processing operation ④-2 is a variant example of the program processing in Step 8 of FIG. 2, and it is an operation for writing a unique code of a vehicle entered in a chip 3 of a proper ignition key 1 into an EEPROM 36.

Whether a startup signal supplied to a signal line L1 from an immobilizer 6 was received or not is judged (Step 60). When it is judged that the startup signal was received, the operation goes to Step 61, while the processing operation ④-2 is ended at once when it is judged that the startup signal has not been received.

When it is judged that the startup signal was received in Step 60, whether a flag $f_1$ for remote starting is 1 or not is judged (Step 61). When it is judged that the flag $f_1$ for remote starting is 1, or that the ignition key 1 is not inserted in a key cylinder 4, the processing operation ④-2 is ended at once.

On the other hand, when it is judged that the flag $f_1$ for remote starting is not 1, or that the ignition key 1 is inserted in the key cylinder 4, whether some data has been already stored in the EEPROM 36 or not is judged (Step 62). When it is judged that no data has been stored in the EEPROM 36, or that the EEPROM 36 is in a clear state, whether a code supplied to a signal line L2 from a transponder 5 (or a code the transponder 5 obtained by conducting radio communication with the chip 3 of the ignition key 1) was received or not is judged (Step 63).

When it is judged that the code has not been received, it returns to Step 63, wherein the transmission of the code is waited for. On the other hand, when it is judged that the code was received, a timer $t_1$ is set at 0 and started up (Step 64), and then, whether an engine has been started or not is judged based on an alternator driving signal (Step 65).

Since the code supplied to the signal line L2 from the transponder 5 is received not only by the remote starting control system 31C but also by the immobilizer 6, the permission signal is given to an engine controller 7 when the code is identical to the unique code of the vehicle (or when the proper ignition key 1 is inserted in the key cylinder 4).

As a result, in cases where the proper ignition key 1 is turned to the starter output position, the engine is started. In other words, if the starting of the engine can be detected, it can be judged that the code is the unique code of the vehicle.

Therefore, when it is judged that the engine has been started in Step 65, it is judged that the code is the unique code of the vehicle, and the code transmitted from the transponder 5 (the unique code of the vehicle) is stored in the EEPROM 36 (Step 66).

On the other hand, when it is judged that the engine has not been started, whether the timer $t_1$ has counted to a prescribed period $T_1$ (e.g., 6 seconds) or not is judged (Step 67). When it is judged that the timer $t_1$ has not counted to the prescribed period $T_1$, it returns to Step 65, wherein whether the engine has been started or not is judged again. On the other hand, when it is judged that the timer $t_1$ has counted to the prescribed period $T_1$, the processing operation ④-2 is ended at once without writing the code into the EEPROM 36.

By the way, when it is judged that some data has been stored in the EEPROM 36, or that the EEPROM 36 is not in a clear state (there is a high possibility that a unique code of a vehicle has been entered therein), whether a code supplied to a signal line L2 from a transponder 5 (or a code the transponder 5 obtained by conducting radio communication with the chip 3 of the ignition key 1) was received or not is judged (Step 68).

When it is judged that the code has not been received, it returns to Step 68, wherein the transmission of the code is waited for. On the other hand, when it is judged that the code was received, whether the received code is the same as the code stored in the EEPROM 36 or not is judged (Step 69).

When it is judged that the received code is the same as the code stored in the EEPROM 36, the processing operation ④-2 is ended at once because of no need for rewriting the code. On the other hand, when it is judged that the received code is not the same as the code stored in the EEPROM 36, the timer $t_1$ is set at 0 and started up (Step 70). And then, whether the engine has been started or not is judged based on an alternator driving signal (Step 71).

When it is judged that the engine has been started, it is judged that the code is the unique code of the vehicle, and the code transmitted from the transponder 5 (the unique code of the vehicle) is stored in the EEPROM 36 (Step 72). Or, it is judged that the ignition key was replaced and that the unique code of the vehicle was changed to a new code, and rewriting of the code is conducted.

On the other hand, when it is judged that the engine has not been started, whether the timer $t_1$ has counted to a prescribed time $T_1$ (e.g., 6 seconds) or not is judged (Step 73). When it is judged that the timer $t_1$ has not counted to the prescribed time T1, it returns to Step 71, wherein whether the engine has been started or not is judged again. On the other hand, when it is judged that the timer $t_1$ has counted to the prescribed time $T_1$, the processing operation ④-2 is ended at once without writing the code into the EEPROM 36.

Using the remote starting control system according to the fourth embodiment, when it is judged that a specific code output in response to an insertion of the ignition key 1 into the key cylinder 4 is not identical to the code stored in the EEPROM 36 and that the specific code is suitable for storage in the EEPROM 36, rewriting of the code to be stored in the EEPROM 36 is conducted. Therefore, for example, even if the ignition key 1 or the immobilizer 6 is replaced and the unique code of the vehicle is changed, it is possible to store a changed unique code of the vehicle in the EEPROM 36 through a regular start operation.

Here, in the remote starting control system according to the fourth embodiment, the rewriting of the unique code of the vehicle is conducted, but in the remote starting control system according to another embodiment, multiple unique codes of a vehicle can be stored and the codes may not be rewritten but additionally stored.

When a start instruction of an engine by remote control is given with multiple codes stored, only a latest code (a code stored at last) is supplied to the immobilizer 6, or multiple codes may be supplied to the immobilizer 6 in turn each time a startup signal is received.

The present invention is not limited to the above embodiments, and, for example, as a basis for determining the starting of an engine, anything from that the starting of the engine can be judged such as the number of revolutions of the engine is applicable.

What is claimed is:

1. A remote starting system mounted on a vehicle equipped with a starting control device and for interfacing with the starting control device, the starting control device being operable to capture a prescribed code output in response to a predetermined operation, operable to determine whether the captured prescribed code matches a unique vehicle code of the vehicle, and operable to permit a start of the vehicle when it is determined that the captured prescribed code matches the unique vehicle code, the remote starting system comprising:
    a remote control device operable to transmit a start instruction;
    a code storage device operable to store a code;
    a suitability judgment device operable to judge whether the prescribed code output in response to the predetermined operation is suitable for storage in the code storage device;
    a first code storage controller operable to receive the prescribed code output in response to the predetermined operation and operable to store the prescribed code in the code storage device only if the prescribed code is judged, by the suitability judgment device, to be suitable for storage, such that the prescribed code output in response to the predetermined operation and received by the first code storage controller is prevented from being stored in the code storage device when the suitability judgment device judges that the prescribed code is not suitable for storage; and
    a code supply controller operable to supply the prescribed code stored in the code storage device to the starting control device when the start instruction is received from the remote control device, the supplied prescribed code being used by the starting control device for determining whether the supplied prescribed code matches the unique vehicle code,
    wherein the suitability judgment device judges whether the prescribed code is suitable for storage based on a state of an engine within the vehicle, such that, when the engine is judged to have not started and a timer has counted to a prescribed period from a time of a specified event, the prescribed code is judged to not be suitable for storage and the first code storage controller prevents the prescribed code received by the first code storage controller from being stored in the code storage device.

2. The remote starting system according to claim 1 further comprising:
    a matching judgment device operable to judge whether the prescribed code matches the code stored in the code storage device; and
    a second code storage controller operable to rewrite the code stored in the code storage device to the prescribed code if the prescribed code is judged, by the matching judgment device, to not match the code stored in the code storage device and if the prescribed code is judged, by the suitability judgment device, to be suitable for storage.

3. The remote starting system according to claim 1, wherein:
    the code storage device is operable to store multiple codes;
    the remote starting system further comprises an entry judgment device operable to judge whether the prescribed code has been stored in the code storage device; and
    the second code storage controller is operable to store the prescribed code in the code storage device if the entry judgment device judges that the prescribed code has not been stored in the code storage device and if the suitability judgment device judges that the prescribed code is suitable for storage.

4. A remote starting system mounted on a vehicle equipped with a starting control device and for interfacing with the starting control device, the starting control device being operable to capture a prescribed code output in response to a predetermined operation, operable to determine whether the captured prescribed code matches a unique vehicle code of the vehicle, and operable to permit a start of the vehicle when it is determined that the captured prescribed code matches the unique vehicle code, the remote starting system comprising:
    a remote control device operable to transmit a start instruction;
    a code storage device operable to store a code;
    a suitability judgment device operable to judge whether the prescribed code output in response to the predetermined operation is suitable for storage in the code storage device;
    a first code storage controller operable to receive the prescribed code after a supply of power is received by the remote starting system and operable to store the prescribed code in the code storage device only if the prescribed code is judged, by the suitability judgment device, to be suitable for storage, such that the prescribed code output in response to the predetermined operation and received by the first code storage controller is prevented from being stored in the code storage device when the suitability judgment device judges that the prescribed code is not suitable for storage; and
    a code supply controller operable to supply the prescribed code stored in the code storage device to the starting control device when the start instruction is received from the remote control device, the supplied prescribed code being used by the starting control device for determining whether the supplied prescribed code matches the unique vehicle code, wherein the suitability judgment device judges whether the prescribed code is suitable for storage based on a state of an engine within the vehicle, such that, when the engine is judged to have not started and a timer has counted to a prescribed period from a time of a specified event, the prescribed code is judged to not be suitable for storage and the first code storage controller prevents the prescribed code received by the first code storage controller from being stored in the code storage device.

5. The remote starting system according to claim 4 further comprising:
   a matching judgment device operable to judge whether the prescribed code matches the code stored in the code storage device; and
   a second code storage controller operable to rewrite the code stored in the code storage device to the prescribed code if the prescribed code is judged, by the matching judgment device, to not match the code stored in the code storage device and if the prescribed code is judged, by the suitability judgment device, to be suitable for storage.

6. The remote starting system according to claim 4, wherein:
   the code storage device is operable to store multiple codes;
   the remote starting system further comprises an entry judgment device operable to judge whether the prescribed code has been stored in the code storage device; and
   the second code storage controller is operable to store the prescribed code in the code storage device if the entry judgment device judges that the prescribed code has not been stored in the code storage device and if the suitability judgment device judges that the prescribed code is suitable for storage.

7. A remote starting system mounted on a vehicle equipped with a starting control device and for interfacing with the starting control device, the starting control device being operable to capture a prescribed code output in response to a predetermined operation, operable to determine whether the captured prescribed code matches a unique vehicle code of the vehicle, and operable to permit a start of the vehicle when it is determined that the captured prescribed code matches the unique vehicle code, the remote starting system comprising:
   a remote control device operable to transmit a start instruction;
   a code storage device operable to store a code;
   a suitability judgment device operable to judge whether the prescribed code output in response to the predetermined operation is suitable for storage in the code storage device;
   a first code storage controller operable to receive the prescribed code and operable to store the prescribed code in the code storage device only if the prescribed code is judged, by the suitability judgment device, to be suitable for storage, such that the prescribed code output in response to the predetermined operation and received by the first code storage controller is prevented from being stored in the code storage device when the suitability judgment device judges that the prescribed code is not suitable for storage; and
   a code supply controller operable to supply the prescribed code stored in the code storage device to the starting control device when the start instruction is received from the remote control device, the supplied prescribed code being used by the starting control device for determining whether the supplied prescribed code matches the unique vehicle code,
   wherein the suitability judgment device judges whether the prescribed code is suitable for storage based on a state of an engine within the vehicle, such that, when the engine is judged to have not started and a timer has counted to a prescribed period from a time of a specified event, the prescribed code is judged to not be suitable for storage and the first code storage controller prevents the prescribed code received by the first code storage controller from being stored in the code storage device.

8. The remote starting system according to claim 7, wherein the first code storage controller stores, in the code storage device, the prescribed code judged to be suitable for storage after a supply of power is received by the remote starting system.

9. The remote starting system according to claim 7, further comprising:
   a matching judgment device operable to judge whether the prescribed code matches the code stored in the code storage device; and
   a second code storage controller operable to rewrite the code stored in the code storage device to the prescribed code if the prescribed code is judged, by the matching judgment device, to not match the code stored in the code storage device and if the prescribed code is judged, by the suitability judgment device, to be suitable for storage.

10. The remote starting system according to claim 7, wherein:
    the code storage device is operable to store multiple codes; and
    the remote starting system further comprises:
       an entry judgment device operable to judge whether the prescribed code has been stored in the code storage device; and
       a second code storage controller operable to store the prescribed code in the code storage device if the entry judgment device judges that the prescribed code has not been stored in the code storage device and if the suitability judgment device judges that the prescribed code is suitable for storage.

11. The remote starting system according to claim 1, wherein the suitability judgment device judges whether the prescribed code is suitable for storage without user interaction and the first code storage controller stores the prescribed code without user interaction.

* * * * *